H. A. MACFARLAND AND A. J. ROTH.
BRACKET AND HOLDER FOR REAR VISION MIRRORS.
APPLICATION FILED MAR. 4, 1920.
1,345,018.                                              Patented June 29, 1920.
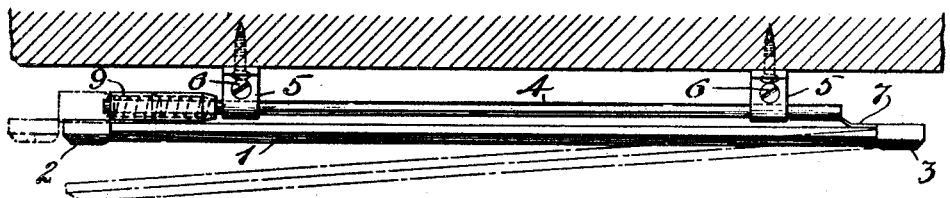
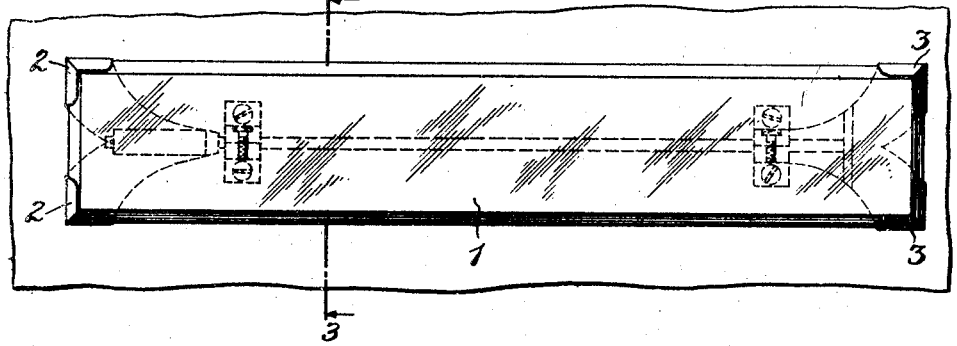
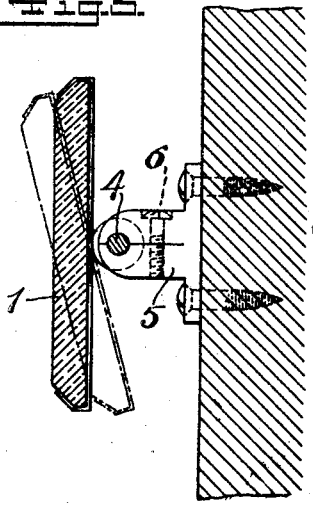
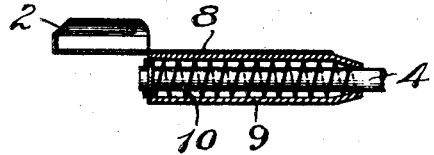

UNITED STATES PATENT OFFICE.

HARRY A. MACFARLAND AND AUGUST J. ROTH, OF MOUNT VERNON, NEW YORK, ASSIGNORS TO THE MOUNT VERNON COMPANY—SILVERSMITHS, INC., OF MOUNT VERNON, NEW YORK, A CORPORATION OF NEW YORK.

BRACKET AND HOLDER FOR REAR-VISION MIRRORS.

1,345,018.   Specification of Letters Patent.   Patented June 29, 1920.

Application filed March 4, 1920. Serial No. 363,112.

*To all whom it may concern:*

Be it known that we, HARRY A. MACFARLAND and AUGUST J. ROTH, citizens of the United States of America, residing at Mount Vernon, Westchester county, New York, have invented a new and useful Bracket and Holder for Rear-Vision Mirrors, of which the following is a specification.

This invention relates to mirrors to be used inside of closed automobiles to enable the driver to see vehicles following and approaching. Such devices are commonly called rear-vision mirrors or mirrorscopes.

The object of our invention is to provide certain features of improvement in such a device, whereby the same may be easily applied and adjusted to the desired angle. Furthermore, the device is such that the mirror itself may be easily removed for cleaning, or replacement in the event of breakage. Again, the device is such that it is exceedingly compact and attractive in appearance when in place.

In the drawings,

Figure 1 is a plan view of our invention, practically full sized;

Fig. 2 is a front elevation;

Fig. 3 is a section on the line 3—3 of Fig. 2; and

Fig. 4 is a section of a detail, somewhat enlarged.

1 represents the mirror or reflector itself. In this instance said mirror is rectangular in form and is gripped at four corners by clips 2—2 and 3—3. 4 is a shaft mounted to turn friction-tight in brackets 5—5. These brackets 5—5 may be secured in any suitable way to the front inner wall of the car at an appropriate place, for example, above the front windshield. In the form shown, the brackets are slitted to form jaws, which grasp the shaft 4, and are each provided with a clamping screw 6, so that the tension of the jaws on the rod or shaft 4 may be set up to any desired degree. The clips 3—3 are preferably rigidly connected to one end of the rod 4 by a plate 7. The clips 2—2 are carried by a plate 8 (Fig. 4), which plate is carried by a tube 9, which tube is mounted to slide on the end of the rod 4. 10 is a spring around the rod 4 and inside of the tube, the same operating to move the tube normally in a direction to cause the clips 2—2 to hug on the corners of the mirror 1.

*Operation.*

When the brackets 5—5 are secured in place and the desired tension is provided on the jaws thereof, so that the rod 4 will be held with the proper degree of tightness, the operator may simply grasp the ends of the mirror and rock it to the desired angle, so that he will get the desired rearward vision reflected therein. In Fig. 3 we have shown how the mirror may be rocked by indicating one position in solid lines, and another position in dotted lines. If, for any reason, it may be desirable to remove the mirror, the clips 2—2 may be grasped and pulled out to the dotted line position indicated in Fig. 1, so that the mirror may be removed, as also indicated in dotted lines in said figure. It will be observed that the entire device presents an exceedingly attractive appearance, in that none of the metal fittings are visible, save the corner clips. Of course, the form of the brackets may be modified in a variety of ways, to fit the different conditions found to exist in different automobile bodies. So, also, the particular friction devices may be modified, and it is equally apparent that the clip construction may be modified so as to release the mirror whenever desired.

What we claim is:

1. In a device of the character described, a mirror holder comprising clips to engage said mirror adjacent its ends, a rock shaft supporting said clips whereby the angle of the mirror may be changed at will, one of said clips being mounted on the shaft so as to turn therewith, and so that the shaft may be turned thereby, and a spring connection between the other clip and said shaft whereby the clip may be moved to release the mirror.

2. A mirror holder comprising a shaft, a bracket for supporting said shaft and in which said shaft may be adjusted angularly, a mirror holding clip carried by said shaft at one end and non-rotatable relatively thereto, another clip carried by said shaft at the opposite end and slidable longitudinally thereon, whereby the same may be moved to and fro relatively to the first mentioned clip for the purpose of engaging or disengaging a mirror.

3. A mirror holder comprising a shaft, a bracket for supporting said shaft and in which said shaft may be adjusted angularly, a mirror holding clip carried by said shaft at one end and non-rotatable relatively thereto, another clip carried by said shaft at the opposite end and slidable longitudinally thereon, whereby the same may be moved to and fro relatively to the first mentioned clip for the purpose of engaging or disengaging a mirror, said clips being designed to engage said mirror at its corners.

HARRY A. MACFARLAND.
AUGUST J. ROTH.